M. S. & J. A. BROWN.
KAFIR CORN HEADER AND LOADER.
APPLICATION FILED NOV. 27, 1911.
1,054,822.
Patented Mar. 4, 1913.
4 SHEETS—SHEET 3.
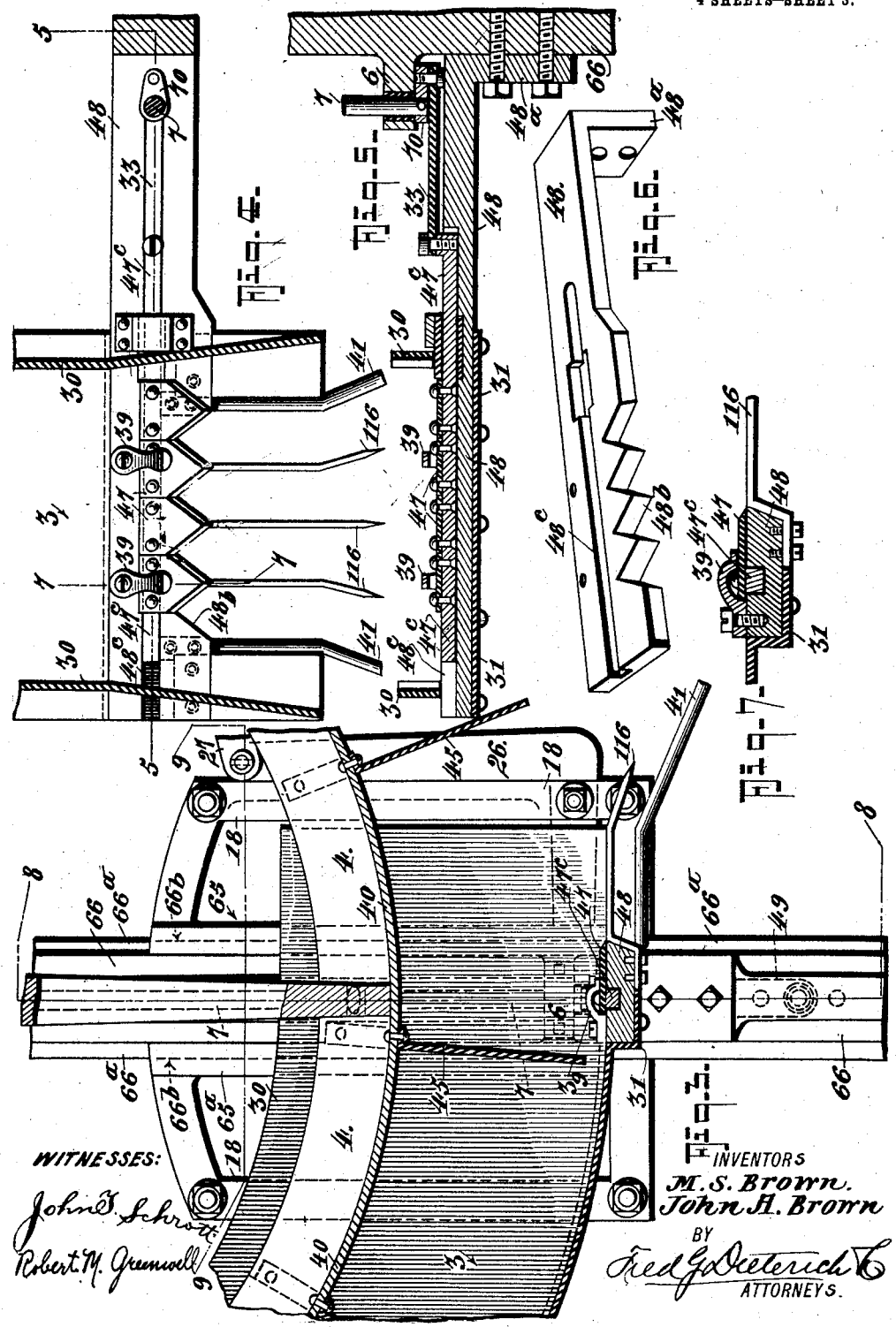
WITNESSES:
John J. Schrott
Robert M. Grunwell
INVENTORS
M. S. Brown.
John H. Brown
BY
Fred G. Dieterich
ATTORNEYS.

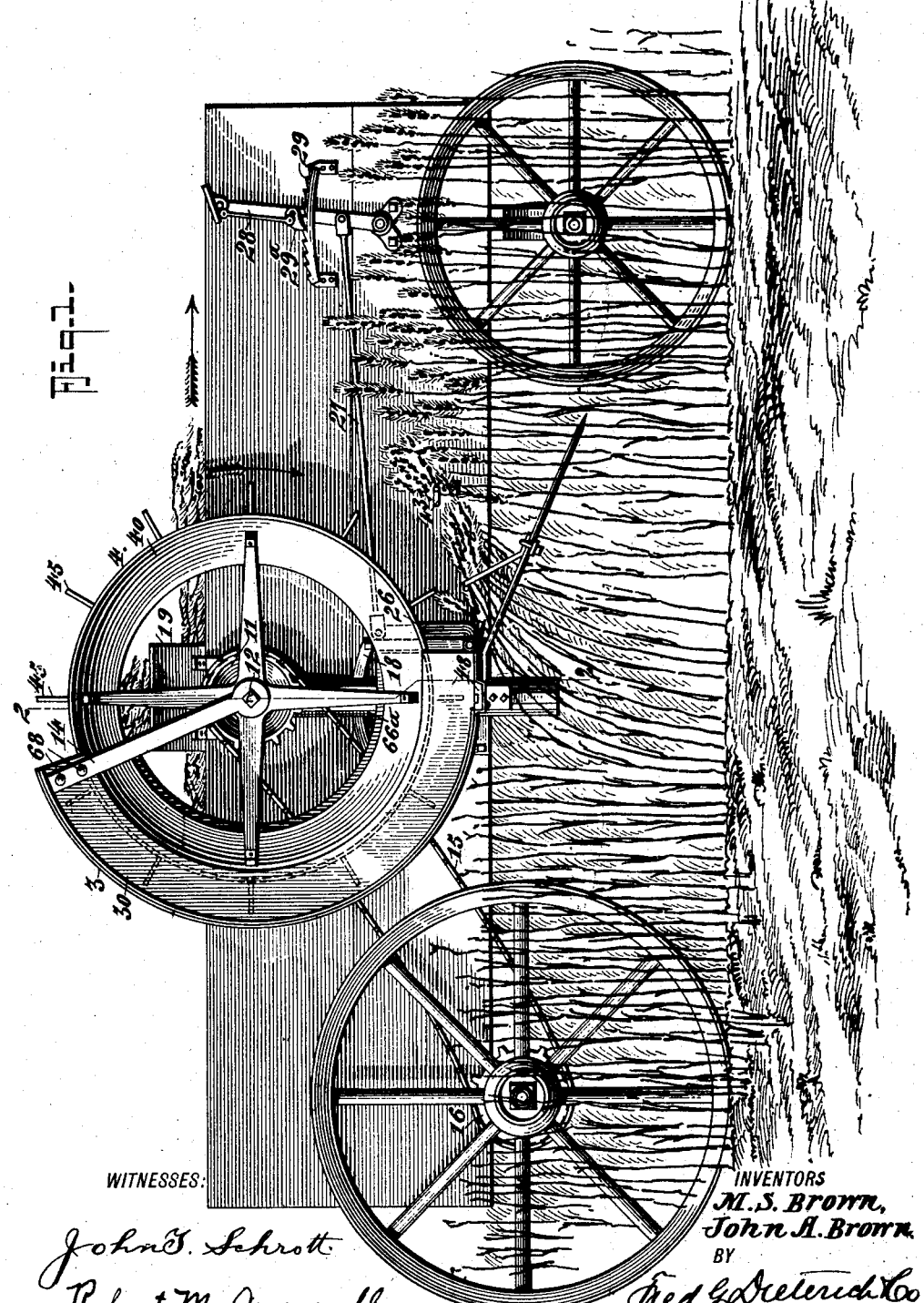

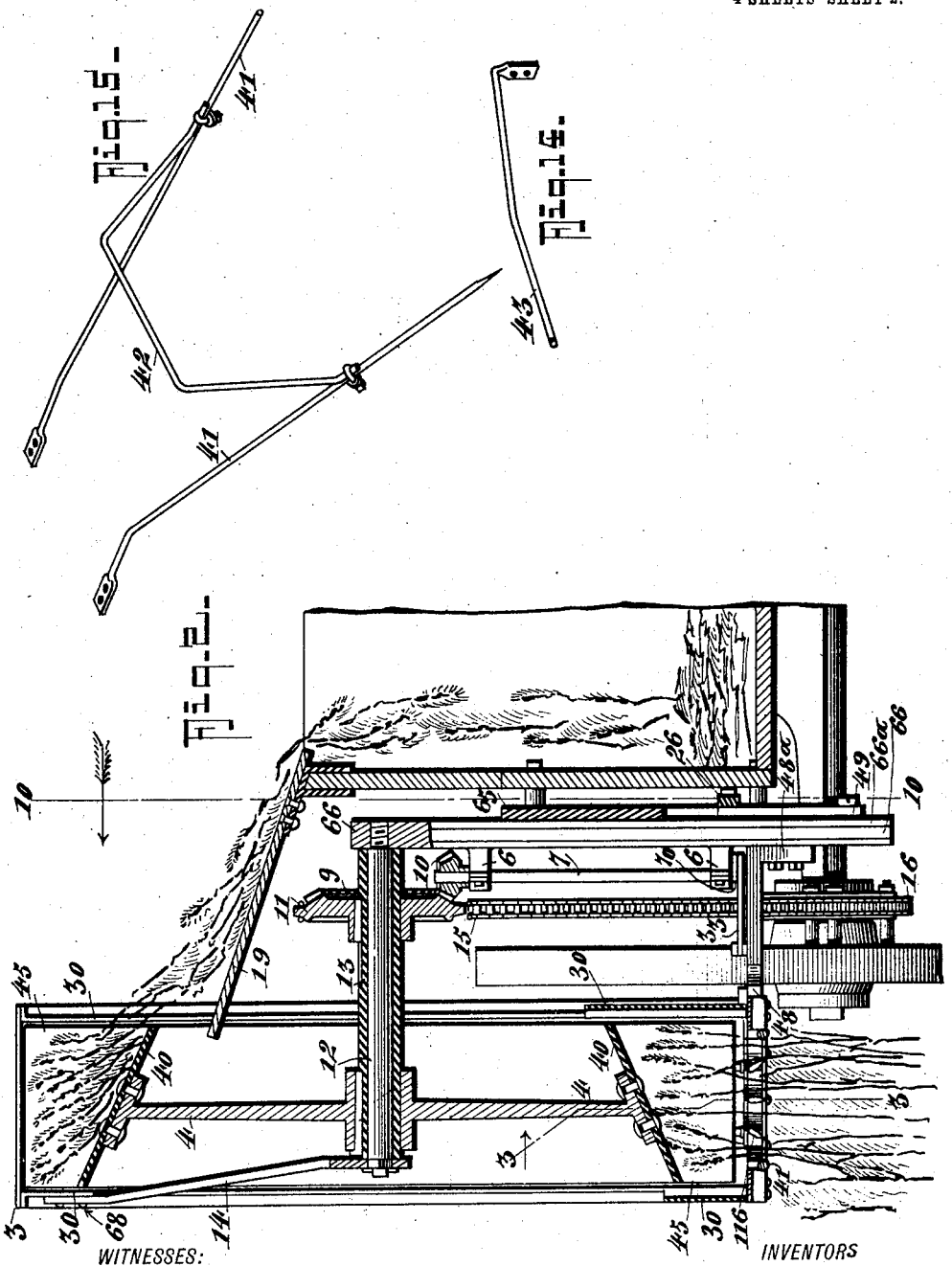

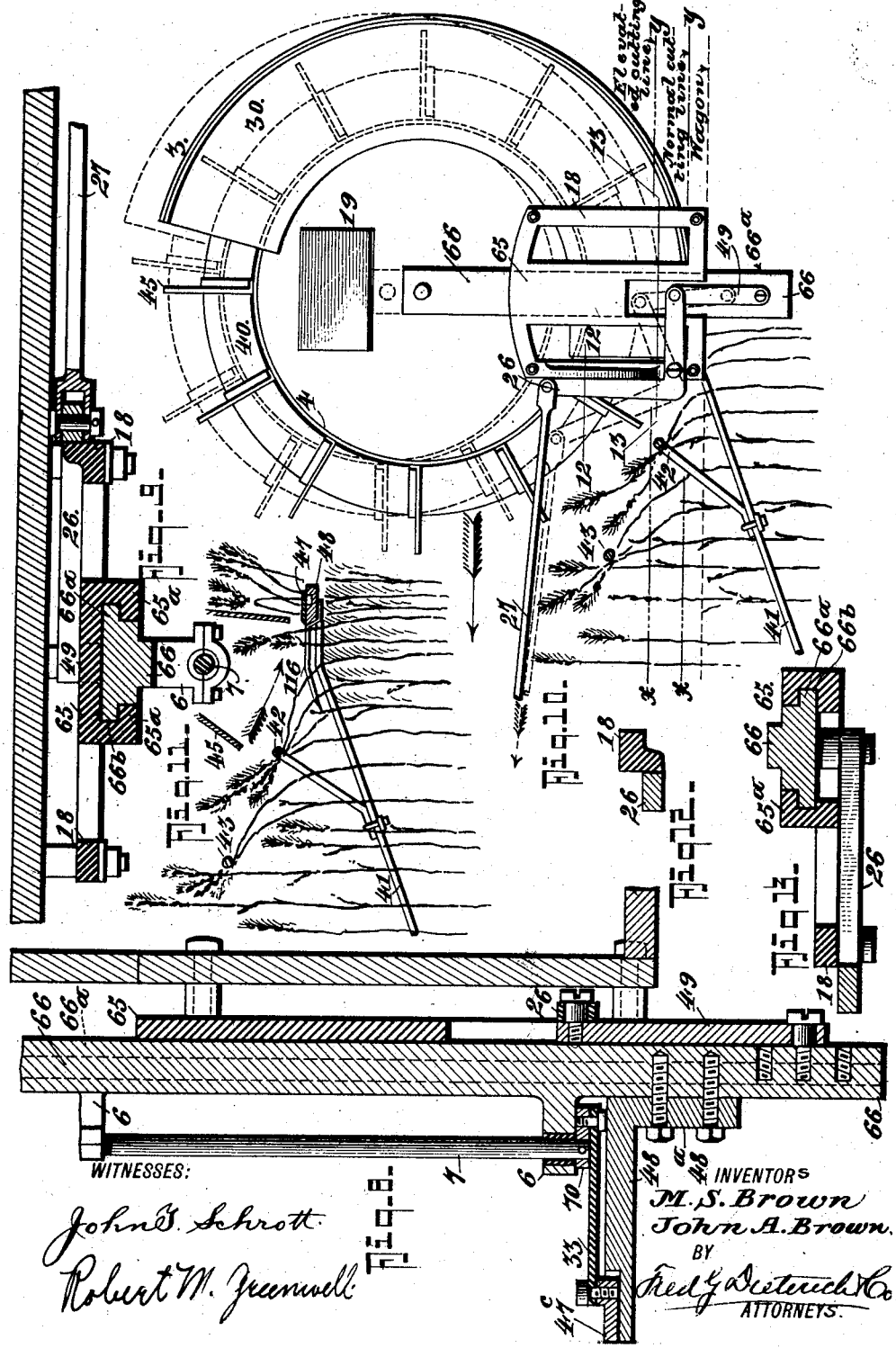

UNITED STATES PATENT OFFICE.

MARION S. BROWN AND JOHN A. BROWN, OF FORT SCOTT, KANSAS.

KAFIR-CORN HEADER AND LOADER.

1,054,822.   Specification of Letters Patent.   Patented Mar. 4, 1913.

Application filed November 27, 1911. Serial No. 662,603.

*To all whom it may concern:*

Be it known that we, MARION S. BROWN and JOHN A. BROWN, residing at Fort Scott, in the county of Bourbon and State of Kansas, have invented a new and Improved Kafir-Corn Header and Loader, of which the following is a specification.

This invention relates to that class of Kafir corn heading or topping machines adapted for being used in conjunction with an ordinary farm wagon and it primarily has for its object to provide a machine of the character stated of an economical and stable construction that can be readily applied to the side of a farm wagon, for cutting, gathering, elevating and discharging the cut heads or tops into the wagon.

With other objects in view our invention embodies an improved means for adjustably shifting the mechanism for cutting off the tops of corn of different sizes.

Our invention also comprehends an improved means for bringing the corn tops in proper position for being engaged by gathering and conveying devices, and for holding the longer tops out of the path of the cut tops.

In its more complete nature, our invention includes an improved means for gathering the heads or tops from the cutting mechanism and delivering the same into the wagon.

In its more subordinate features, our invention consists in certain details and novel arrangement of the parts hereinafter fully described, specifically pointed out in the claims and illustrated in the accompanying drawings, in which:—

Figure 1, is a side elevation of a farm wagon equipped with our invention. Fig. 2, is a transverse section taken on the line 2—2 on Fig. 1 and particularly illustrates the cutting, gathering and delivering mechanism. Fig. 3, is a vertical section on the line 3—3 of Fig. 2, on an enlarged scale, the cutting mechanism, part of the gathering means and the adjustable mounting for such parts, the said mounting being shown in elevation. Fig. 4, is a plan view of the cutting mechanism. Fig. 5, is a longitudinal section thereof on the line 5—5 on Fig. 4. Fig. 6, is a detail perspective view of the fixedly held sickle bar. Fig. 7, is a transverse section taken on the line 7—7 on Fig. 4. Fig. 8, is a detail vertical section on the line 8—8 on Fig. 3, parts being omitted to better illustrate the correlation of the remaining parts. Fig. 9, is a horizontal section of the parts shown in Fig. 3, and taken on the line 9—9 of said figure. Fig. 10, is a vertical elevation of the frame elevating or adjusting mechanism, looking at the inner side of the same, see arrow line 10—10 of Fig. 2. Fig. 11, is a detail view that illustrates the coöperative arrangement of the initial and secondary corn top bender devices hereinafter specifically referred to. Fig. 12, is a detail cross section on the line 12—12 on Fig. 10. Fig. 13, is a detail horizontal section on the line 13—13 on Fig. 10. Figs. 14 and 15, are detail views of the first and second bender devices hereinafter explained.

In carrying out the invention our improved topping and gathering mechanism is mounted on the wagon and is adapted for cutting the right hand rows of the corn.

Referring now more particularly to Figs 1 and 2. 18 designates a base casting or frame that is fixedly bolted to or otherwise made fast to the side of the wagon, near the bottom thereof and the said casting includes a central vertical guide member 65 having overlapping side flanges 65ᵃ in which the main supporting bar 66 is held to slide vertically, the said bar having side flanges 66ᵃ for engaging the side grooves 66ᵇ of the guide member 65, see Fig. 9. For adjusting the bar 66 to set the cutting, gathering and delivering mechanism to suit corn of different heights, we employ a foot lever 28 mounted on the front end of the wagon and provided with the usual rack and pawl devices 29—29ᵃ.

26 denotes a bell crank lever mounted on the frame 18 with which connects a reach bar 27 that joins with the lever 28, and a link 49 that is pivotally connected to the lower end of the sliding bar 66, as is best shown by Fig. 10, from which it will be apparent that by shifting the foot lever 28, in the direction desired, the bar 66 may be raised or lowered to bring the cutting mechanism to different horizontal planes, as indicated by the broken lines *x—y*, on Fig. 10.

The cutting mechanism, best shown in Figs. 4, 5, 6 and 7, comprises a bracket arm 48 having a leg 48ᵃ that bolts to the combined adjusting and supporting bar 66 and whose front edge is provided with the stationary cutting fingers 48ᵇ. The upper face of the bar 48 has a longitudinal recess 48ᶜ in which plays the sickle bar 47ᶜ that carries the movable cutters 47 which are held down in proper coöperative engagement with the stationary cutter bar 48 by the overhanging brackets 39, bolted to the said stationary bar 48, as is best shown in Fig. 7. For guiding the heads to the cutters and for supporting the cut heads, said cutting mechanism includes a series of central parallel and forwardly disposed fingers 116 and side guards 41 that divergingly extend forwardly and downwardly, see Figs. 1 and 15 to act as gatherers and to bunch the corn tops as they approach the cutters and to further provide for bending the tops over and holding them from being engaged by the conveyer mechanism, presently referred to, an arched cross rod 42 is secured to the arms 41, it being clear from the drawing that by inclining the arms 41 downwardly, as shown and stated, the bender rod 42 is in a plane low enough to bend the corn tops in such manner that the stalks will be fed directly between the cutting teeth.

To provide for taking care of extra high stalks and to keep the tops thereof from being beaten by the conveyer blades, presently referred to, an auxiliary bender 43, in the nature of a rod, secured to and projected from the side of the wagon, is provided, and the said bender 43 is located in advance of and in a higher plane than the bender 42, see Fig. 10.

It will be noticed, by referring to Figs. 1 and 11 of the drawings, that the grain stalks grow to variable heights, therefore the benders are so situated that heads grown up to the certain standard, to which the machine is primarily adjusted, will pass under the benders to the cutting mechanism standing erect, but as the machine approaches heads taller than the standard height for which the machine is adjusted, the said taller heads or stalks are drawn down by the bender 43 to prevent them from being beaten by the blades 45 of the wheel 4 until they shall have been drawn down by the secondary bender 42, it being also evident from the drawing, that the heads will rise from under the bender 42 into the cutting mechanism where they will be cut nearer to a standard length from the top. The benders 42—43 therefore perform a double function, namely,—first, to prevent the grain from being beaten by the blade 45 and secondly that the grain heads may reach the cutting mechanism so that they will be cut to a more standard length as the seed or heads of corn must be cut close up, so as to leave as little stalk as possible on the heads or seed.

The shiftable supporting bar 66 has an upper and a lower apertured bracket bearing 6—6 on its front face, in which is journaled a shaft 7 provided with a crank 70 at the lower end and a bevel pinion 10 at the upper end that meshes with a drive gear rim 9 on the sprocket drive wheel 11 keyed on a sleeve 13 that is mounted and rotatable upon a stationary shaft 12 secured to and projected outwardly from the upper end of the bar 66. A sprocket chain 15 takes over the wheel 11 and over a sprocket wheel 16 mounted on the rear wheel, it being understood that in practice, chain 15 has sufficient slack to compensate for the rise and fall of the wheel 11 with the bar 66.

3 designates a substantially semi-circular trough, composed of the sides 30—30 and end 31. The lower end of the said trough extends down under the bar 48 and its sides 30—30 extend divergingly beyond the cutters, nearly to the ends of the central gathering fingers 116, see Fig. 4, so that the stalk heads are contained within the lower end of the trough as they are severed from the stalks. The upper end of the trough extends above the side of the wagon, as is best shown in Figs. 1 and 2, by reference to which it will be noticed a gathering wheel 4 operates within the trough, the same being keyed on the sleeve 13 on the outer end of shaft 12 and is held from working off the said outer end by a keeper arm 14 that engages the outer end of the shaft and is made fast to the outer side of the trough, as indicated by 68. Wheel 4 includes a conical shaped rim 40 with the incline or dip inwardly, the said incline in practice being preferably not less than six inches to the foot to cause the tops that are gathered on the circumference of the wheel to slide inwardly. Wheel 4 also includes a number of radial paddle-like blades 45 that sweep through the trough 3 and convey the tops or heads up to the upper or discharging end of the trough, from whence the said tops fall inwardly onto an inclined platform 19 that projects from the upper edge of the wagon, see Fig. 2.

33 designates the pitman rod that joins the movable sickle or cutter bar with the crank 70 of shaft 7.

From the foregoing taken in connection with the drawings the complete construction, the manner in which the machine is operated and its advantages will be readily apparent.

By reason of the peculiar arrangement and combination of the parts, as shown and described, assuming the wagon to be traveling in the direction indicated by the arrow on Fig. 10 the front or auxiliary bender engages the tops of the long stalks and bends them down so they, with the other stalk-tops, are bent down by the bender 42 it being understood that the several guides 116 tend to support and hold the cut heads from falling to the ground and in position to be engaged by the sweeps or paddles of the conveyer wheel 4, which carries the cut heads and delivers them onto the platform 19, from whence they drop into wagon, as before stated.

While the detailed arrangement shown and described is a preferred construction, we do not limit ourselves to the same, since the said construction may be varied or modified without departing from our invention or the scope of the appended claims.

What we claim is:

1. A machine of the character described, comprising cutting mechanism, means for elevating the cut tops and discharging them into the wagon, other means for guiding the stalks to the cutting mechanism, said guiding means including forwardly extended side arms and a cross member on the arms for bending the stalk tops over, and a supplemental top bending means in advance of the said cross member and in a plane above the said cross member.

2. In a machine of the character described, the combination with a wagon body; of a supporting frame vertically adjustable upon the said wagon body, means for holding said frame to its adjustments, a horizontally disposed cutting mechanism, a gathering and discharging mechanism vertically disposed with reference to the cutting mechanism, and a means for guiding the stalks to the cutting mechanism, the said cutting mechanism and gathering and discharging mechanism being mounted upon the vertically movable frame and bodily adjustable therewith, power transmission for operating the gathering, cutting and discharging mechanisms coupled with a drive member of the wagon, the guiding means including a series of centrally disposed fingers extended forwardly from the cutting mechanism, oppositely disposed side arms that project forwardly and downwardly from the cutting mechanism and a bridge member that joins the said arms.

3. In a machine of the character described, the combination with a wagon body; of a supporting frame vertically adjustable on the wagon body, means for controlling the adjustments of the said frame, a cutting mechanism, a gathering and discharging mechanism and a means for guiding the stalks to the cutting mechanism, the said means, the gathering and discharging mechanism and the cutting mechanism all being mounted upon the vertical frame and bodily adjustable therewith, power transmission for operating the cutting, gathering and discharging mechanisms coupled with a drive member of the wagon, the guiding means including a series of centrally disposed fingers extended forwardly from the cutting mechanism, and opposite side arms that project forwardly and downwardly from the cutting mechanism and a bridge member that joins the side arms located in advance of the centrally disposed fingers.

4. In a machine of the character described, a horizontally disposed cutting mechanism, means for adjustably mounting it upon the side of a wagon, and projecting it laterally therefrom, means for guiding the stalks to the cutting mechanism, an arc shaped trough for receiving the cut tops from the cutting mechanism, the said trough extending above and arranged to discharge over the side of the wagon and a rotary member having sweep blades movable in the trough for engaging the tops as they are cut to convey them up through the trough.

5. In a machine of the character described, a mechanism adapted for being mounted upon the side of a wagon, said mechanism including cutting devices, means for guiding the stalks to the cutting devices, a semicircular trough for receiving the cut tops from the cutting devices, and which passes up above the side of the wagon, a wheel concentrically mounted within the trough, the said wheel having sweep blades for engaging the cut tops for conveying them up through the trough, the wheel being frusto-conical in shape and located with its end of lesser diameter adjacent to the wagon side.

6. In a machine of the character described, mechanism adapted to be mounted upon the side of a wagon, cutting devices, means for guiding the stalks to the cutting devices, a semi-circular trough to receive the cut tops of the stalks from the cutting devices, said trough extending above the side of the wagon, a frusto-conical shaped wheel having sweep blades for engaging the cut tops to convey them up through the trough, said wheel having its end of lesser diameter located adjacent to the wagon and its end of greater diameter located away from the wagon, and a platform on the wagon upon which the toppings are dropped to convey said toppings into the wagon.

7. In a corn topping machine, vertically adjustable cutting, gathering and discharging mechanisms, means for shifting and holding said mechanisms to their adjusted positions, means for guiding and bending the stalk-tops as they approach the cutting mechanism and a stationarily held auxiliary stalk bending device in advance of and in a plane above the said guiding and bending means.

MARION S. BROWN.
JOHN A. BROWN.

Witnesses:
SAMUEL BERNER,
FRED ROY ALFORD.